United States Patent [19]

Lee

[11] 4,263,616
[45] Apr. 21, 1981

[54] SIGNAL PEAKING METHOD AND APPARATUS

[75] Inventor: Ronald B. Lee, Skokie, Ill.

[73] Assignee: Zenith Radio Corporation, Glenview, Ill.

[21] Appl. No.: 99,373

[22] Filed: Dec. 3, 1979

[51] Int. Cl.³ .............................................. H04N 5/14
[52] U.S. Cl. ................................................. 358/166
[58] Field of Search ................. 358/166, 37; 307/263, 307/268

[56] References Cited

U.S. PATENT DOCUMENTS

| | | | |
|---|---|---|---|
| 4,030,121 | 6/1977 | Faroudja | 358/166 |
| 4,081,836 | 3/1978 | Skinner | 358/166 |
| 4,164,758 | 8/1979 | Kowal | 358/167 |

Primary Examiner—John C. Martin

[57] ABSTRACT

A method and apparatus is disclosed for peaking the amplitude transitions of an information-bearing signal such as a video signal. From the video signal, a control signal and a peaking signal are developed, each having magnitude variations related to and occurring in time correlation with amplitude transitions in the video signal. The control signal is employed to modulate the peaking signal such that when transitions in the control signal exceed a threshold amplitude, the peaking signal is coupled to an output terminal at or above a given gain level, and when the transitions in the control signal are less than the threshold amplitude, the peaking signal is coupled to an output terminal at a reduced but non-zero gain level. The modulated peaking signal appearing at the output terminal is combined with the video signal to cause relatively high level video transitions to receive a high level of peaking and relatively lower level video transitions to receive lesser peaking.

21 Claims, 13 Drawing Figures

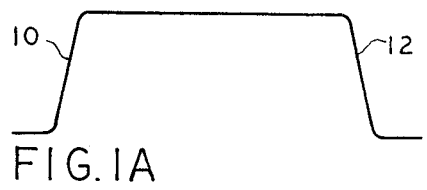
FIG. IA
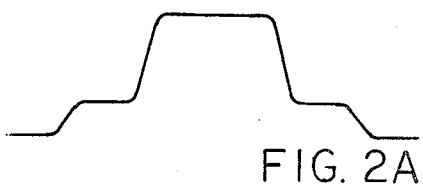
UNPEAKED VIDEO
FIG. 2A
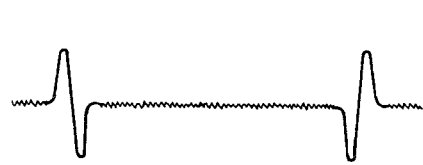
FIG. IB
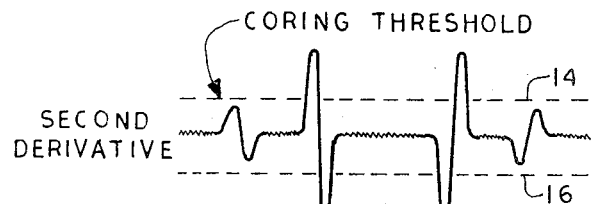
SECOND DERIVATIVE
FIG. 2B
CORED SECOND DERIVATIVE
FIG. 2C
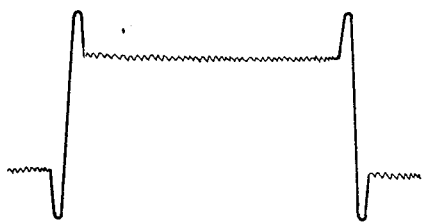
FIG. IC
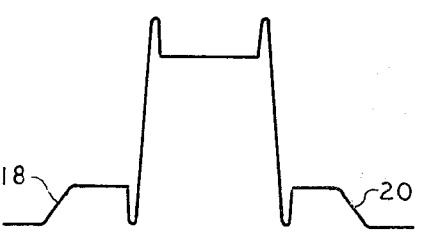
PEAKED VIDEO
FIG. 2D
PRIOR ART PEAKING
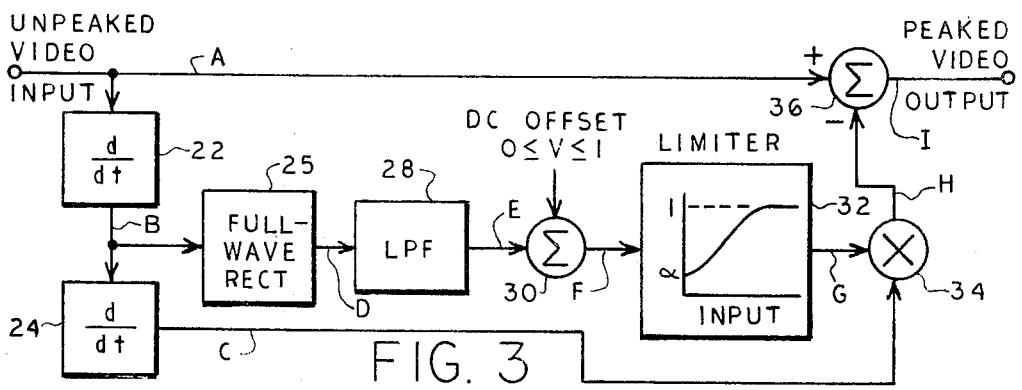
FIG. 3

A 
B 
C 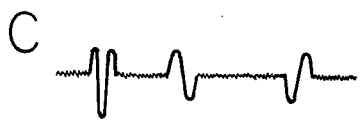
D 
E 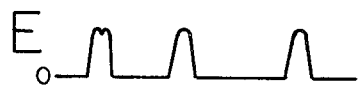
F 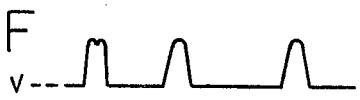
G 
H 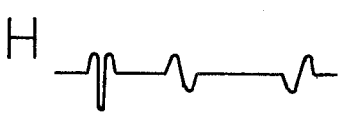
I 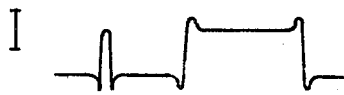
FIG. 4
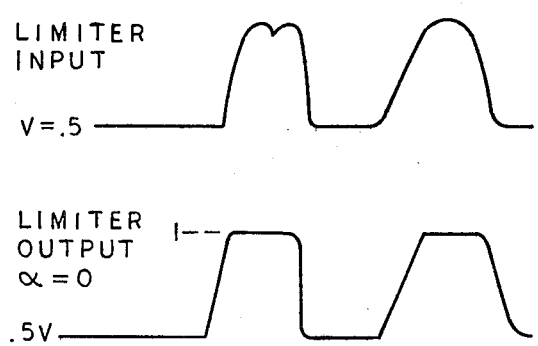
FIG. 5
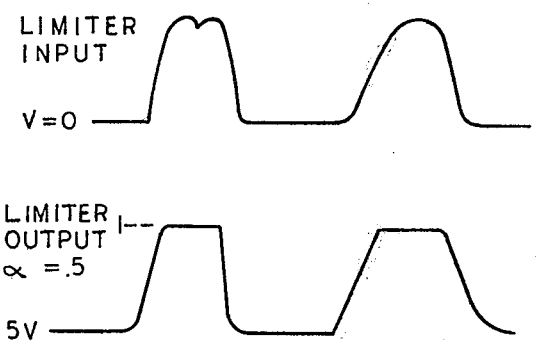
FIG. 6
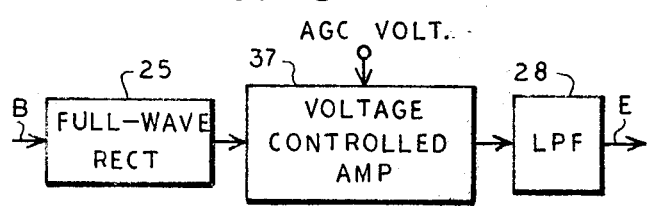
FIG. 7

SIGNAL PEAKING METHOD AND APPARATUS

BACKGROUND OF THE INVENTION

The invention is directed to an improved method and circuit for peaking information-bearing signals, such as video signals developed in television receivers.

Analog signals used for the transmission of information may become degraded because of the limited bandwidth of their transmission channel. One such form of degradation occurs when the rise and fall times of an analog information signal become undesirably large.

For example, in television receivers an analog video signal is developed for intensity modulating the electron beam of a cathode ray tube. If the video signal does not have sharp leading and trailing edges (i.e., fast rise and fall times), the reproduced television image may not appear to be "crisp".

To develop a more crisp television image, it is conventional to "peak" the video signal so as to add pre-shoot and overshoot to it. The resultant faster rise and fall times of the video signal tend to provide a more pleasing television image.

One method which has been used to peak a video signal is to develop a peaking signal comprising the second derivative of the video signal and to subtract the peaking signal from the video signal itself. Although the resultant peaked video signal does have considerable pre-shoot and overshoot, any noise present in the original video signal becomes enhanced in the peaked video signal. Consequently, the television image becomes degraded. Accordingly, the amount of peaking which this method can practically provide is limited by the amount of noise present in the original video signal.

Two additional peaking schemes have been proposed for reducing the effect of noise in a peaked signal. In the television art, these schemes are referred to as "straight coring" and "non-linear amplifications". Both such schemes operate on the assumption that noise is primarily low level information. Based on that assumption, low level signals are removed from the peaking signal prior to subtracting the peaking signal from the original video signal. Of course, low level information signals are likewise indiscriminantly removed from the peaking signal along with the noise. Consequently, the peaked video signal develops an unnatural television image because of the lack of fine detail. An exemplary noise cancellation scheme employing coring of a television video signal is described in U.S. Pat. No. 3,995,108 to Morrison.

The problems noted above with prior peaking systems have rendered such systems less than entirely satisfactory, particularly because of their inability to reproduce television images having fine detail without a disproportionate amount of noise.

OBJECTS OF THE INVENTION

It is a general object of the invention to provide an improved method and apparatus for peaking information-bearing signals.

It is another object of the invention to provide an improved method and apparatus for peaking the video signal developed in a television receiver.

It is a more specific object of the invention to provide a peaking method and circuit which provides pre-shoot and overshoot transitions for a television receiver's video signal so as to provide a television image having improved detail and yet lacking the enhanced noise content associated with prior peaking methods.

BRIEF DESCRIPTION OF THE FIGURES

The objects stated above and other objects of the invention are more particularly set forth in the following detailed description and in the accompanying drawings of which:

FIGS. 1A-1C and 2A-2D illustrate prior peaking techniques;

FIG. 3 is a functional block diagram embodying a peaking technique and structure therefor according to the invention;

FIG. 4 illustrates various waveforms useful in explaining the operation performed by the embodiment of FIG. 3;

FIGS. 5 and 6 depict illustrative waveforms for explaining the operation of the limiter shown in FIG. 3;

FIG. 7 illustrates a modification to the structure shown in FIG. 3; and

DESCRIPTION OF THE PREFERRED EMBODIMENT

Figure 8:
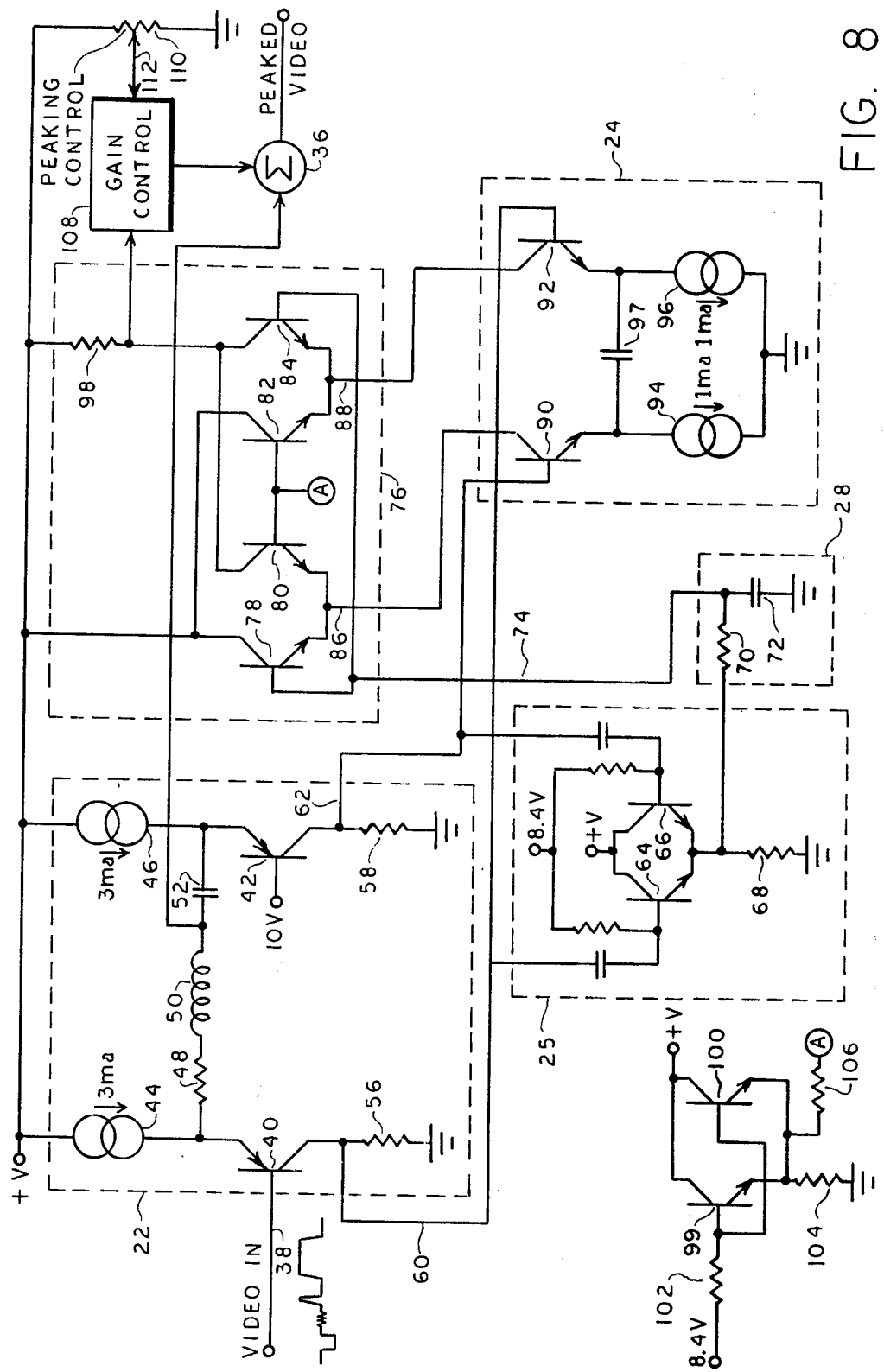
FIG. 8 is a detailed circuit diagram of a preferred structure for effecting the functions of the FIG. 3 embodiment.

As stated above, one method of peaking a signal such as a video signal is to subtract the second derivative of the video signal from the video signal itself. For example, waveform A of FIG. 1 illustrates an exemplary video signal having a pair of unpeaked amplitude transitions 10 and 12. The second derivative of the video signal (FIG. 1B) is developed and subtracted from the video signal to provide a peaked video signal (FIG. 1C) whose amplitude transitions exhibit pre-shoot and overshoot as desired. However, any noise present in the original unpeaked video signal becomes enhanced in the second derivative signal and appears at its enhanced level in the peaked video signal. In many instances, the resultant noise in the peaked video signal determines the limit of peaking which can be tolerated before the peaked video becomes objectionally degraded.

One conventional method for reducing the noise in a peaked signal is referred to as coring. In this method, an unpeaked video signal such as that shown in FIG. 2A is processed to develop a second derivative signal (FIG. 2B) from which all low level components, including low level noise components, are removed. In the illustrated example, all components of the second derivative signal which do not exceed the coring threshold defined by the dashed lines 14 and 16 are simply removed or cored from that signal. The resulting cored signal employed for peaking is shown in FIG. 2C.

Next, the cored second derivative signal is subtracted from the unpeaked video signal to provide the peaked video signal of FIG. 2D. Because the low level peaking components were removed by the coring process, low level amplitude transitions 18 and 20 in the peaked signal remain unpeaked. Where the peaked video signal is used to produce a television image, the resultant image lacks fine detail. Moreover, complete coring of the noise has been found to result in an unnatural image having a "painted on" appearance.

Another conventional approach to reducing the effects of noise in a peaked video signal relies on the effect of non-linearly amplifying the second derivative signal. According to this method, the second derivative of a video signal is developed, and then the latter signal is non-linearly amplified such that high level amplitude transitions are amplified to a greater extent than low level amplitude transitions. Hence, the relative amplitude of low level noise in the second derivative signal is reduced, but low level transitions corresponding to information-bearing transitions are also reduced in amplitude. Hence, when the non-linearly amplified second derivative signal is subtracted from the video signal, the low level amplitude transitions in the video signal are not peaked sufficiently to provide an image with the desired fine detail.

A peaking method according to the invention which overcomes the disadvantages of the conventional methods described above is illustrated by the functional block diagram of FIG. 3. Waveforms which identify the signals present at points A-I in FIG. 3 are shown by correspondingly designated waveforms A-I in FIG. 4.

As shown, an input lead A receives an unpeaked video signal which is to be converted to a peaked video signal at an output lead I. Of course, the present method is not limited to video signals. Many other types of information-bearing signals may be peaked according to the invention. However, the method and apparatus herein are described in terms of a video signal for use in developing a television image.

The steps of peaking the video signal require the development of two signals referred to herein as the peaking signal and the control signal. As described in more detail hereinafter, the peaking signal is modulated by the control signal and then combined with the video signal to provide the peaked video signal at output lead I.

In general, the peaking signal which is developed has amplitude variations related to and occurring in time correlation with amplitude transitions in the video signal. Such amplitude transitions are a function of their step height and their rate of amplitude change between their step limits. A peaking signal exhibiting such correlation is preferably developed by taking the second derivative of the video signal, as by coupling the input lead A to a network 22 which develops at lead B the first derivative of the video signal, and by coupling the lead B to another network 24 which develops at its output lead C the derivative of the signal at lead B. Hence, the second derivative of the video signal appears on the lead C.

As shown by waveforms 4C, the second derivative or peaking signal includes magnitude variations which are related to and which occur in time correlation with the amplitude transitions in the video signal (waveform 4A).

The control signal includes magnitude variations which are related to and which occur in time correlation with amplitude transitions in the video signal and the peaking signal. Such a control signal is developed by the network 22 whose first derivative output at lead B includes the above-stated magnitude variations. Hence, the network of FIG. 3 may be thought of as having a control signal at lead B and a peaking signal at lead C, the latter of which is to be modulated by the control signal in a manner to be described.

Prior to modulating the peaking signal, it is preferable to further process the control signal to condition it for the step of modulation. Such processing preferably includes coupling the control signal at lead B to a full wave rectifier 25 for developing a unipolar output at lead D. However, as explained hereinafter, the inclusion of the rectifier 25 is not critical, as its function may be performed in other ways.

Waveform D of FIG. 4 illustrates the effect of the rectification performed by the rectifier 25. Note that a so-called cusp 26 may appear in the waveform developed by the rectifier. To reduce or remove the cusp as well as noise associated with the control signal, the lead D is coupled to the input of a low pass filter 28. In the case where the video signal at lead A is developed in a television receiver, the filter 28 may have a 3 d.b. bandwidth of about 3.7 megahertz. The output of the filter 28 appears at lead E and is shown as waveform E in FIG. 4.

Modulation of the peaking signal by the control signal is to be effected such that relatively large amplitude transitions in the video signal are greatly peaked and smaller amplitude transitions are peaked to a lesser extent. All transitions in the video signal are modified by the peaking signal to some extent, as opposed to a straight coring method which eliminates peaking of low level transitions in the video signal.

To condition the control signal for such modulation, the output of the filter 28 is applied as one input to a summer 30. Another input to the summer is a D.C. offset voltage V whose value may be selected to be anywhere between zero and 1, depending on the application of the system. Assuming that the value of V is selected to be greater than zero, the inclusion of the offset voltage V in effect changes the baseline voltage on which the control signal is superimposed. Waveform F of FIG. 4 illustrates the effect of the summer 30.

The signal of lead F is then applied to a limiter 32 whose characteristics are shown generally in FIG. 3. Specifically, transitions in the control signal which exceed a predetermined threshold amplitude are limited to an amplitude value of unity. Amplitude transitions which are less than that threshold are outputted from the limiter at an amplitude less than unity, and the minimum value of the limiter's output is either V or alpha, where alpha is selected to be equal to or greater than zero and equal to or less than unity.

To illustrate the operation of the limiter 30, reference is made to FIG. 5 in which it is assumed that the offset voltage V equals 0.5 volt and alpha equals zero. For this condition, the large amplitude transitions in the control signal are limited to a value of unity and the minimum output of the limiter is 0.5 volt.

FIG. 6 illustrates the operation of the limiter when the offset voltage V equals zero volts and alpha equals 0.5 volt. For this condition, large amplitude transitions in the control signal are limited to unity and the minimum output of the limiter is again 0.5 volt.

Suffice it to say that, for the illustrative circuitry shown in FIG. 3, the combined effects of the summer 30 and the limiter 32 are such that the minimum value of the output from the limiter is greater than zero and the maximum output of the limiter is unity. Amplitude transitions in the control signal which are intermediate the values which produce the maximum and minimum limiter outputs appear at lead G at values intermediate those maximum and minimum values. It should also be noted that the minimum value of the limiter's output will be equal to alpha or the offset voltage V, whichever is greater. In practice, it has been found that a value of 0.5 volt for V and a value of zero for alpha provides satisfactory results.

At the output of the limiter 32, therefore, the signal is of the nature shown in waveform G of FIG. 4. That is, control signal transitions corresponding to video signal transitions of a preselected large value are limited to a value of unity, and control signal transitions corresponding to video signal transitions less than that preselected value have a value of less than unity but greater than zero.

To complete the modulation of the peaking signal, the latter is coupled via lead C to a multiplier 34. The other input to the multiplier is taken from the output of the limiter 32 such that the peaking signal is modulated or multiplied by the control signal. Hence, whenever the control signal has a value of unity (corresponding to large transitions in the video signal), the peaking signal is in effect multiplied by unity and is, therefore, outputted at terminal H substantially unaltered. When the minimum value of the limiter's output is 0.5 volt, the peaking signal is multiplied by 0.5 and is, therefore, reduced in amplitude by one-half at terminal H. Intermediate values of the limiter's output, of course, produce corresponding intermediate values of the peaking signal to appear at the multiplier's output terminal. The desired result of such modulation is that so long as the magnitude of the control signal exceeds a predetermined threshold associated with a video signal transition of a preselected value, the modulated peaking signal has a gain at or above a first gain level. In addition, when the magnitude of the control signal is below the threshold, the modulated peaking signal is at a gain level which is substantially greater than zero but lower than the first gain level. Thus, the gain of the modulated peaking signal at terminal H is a function of the magnitude of the amplitude transitions in the video signal.

When the video signal includes low level video transitions and noise, the amplitude of the transitions in the modulated peaking signal should be great enough to be above the noise level in the video signal. If this is not the case, the low level components of the modulated peaking signal will be buried in the video signal noise when the modulated peaking signal is combined with the video signal. The result would be ineffective peaking at lower levels of video and a less than natural video image.

To ensure that low level video transitions are peaked to the desired extent, appropriate values for the offset voltage V and alpha are selected. As stated above, a value of 0.5 for the offset voltage V and a value of zero for alpha provide satisfactory results. Other combinations of V and alpha will also provide the requisite peaking.

The next step in peaking the video signal includes combining the modulated peaking signal with the video signal in a summer 36 so that amplitude transitions in the video signal are peaked by the modulated peaking signal. As indicated in FIG. 3, this may be effected by subtracting the modulated peaking signal at terminal H from the video signal at lead A. Accordingly, amplitude transitions in the video signal corresponding to the above-threshold levels of the control signal receive greater peaking, and amplitude transitions of the video signal corresponding to below-threshold levels of the control signal receive lesser peaking. Because of the above-described modulation technique wherein the peaking signal is never reduced to a zero level, low level components and noise in the peaking signal are also combined with the video signal at a reduced level. Consequently, the peaked video signal at lead I is capable of yielding television pictures which have sharply peaked, high level brightness transitions, and yet which are natural looking without excessive noise due to the presence of a limited amount of low level peaking components and noise in the modulated peaking signal.

The method and apparatus illustrated by FIG. 3 have been described in terms of the limiter 32 limiting its output to a maximum value of unity. In practice, however, the output of the limiter need not be unity. It may be normalized to unity by including one or more stages of gain or amplitude reduction elsewhere in the circuitry. For example, if the limiter provided a maximum output level of two, a divide-by-two network could be included either at the input or the output of the multiplier 34. Hence, when the limiter 32 is stated as having a maximum output of unity herein, it is understood that either an actual or normalized value of unity is referred to.

As previously mentioned, the rectifier 25 may be replaced by other circuitry which performs the same function: namely, to maintain the polarity of the peaking signal at the output of the multiplier 34. For example, if the rectifier 25 is removed, its basic function can be duplicated by including circuitry for sensing the polarity of the control signal and for inverting appropriate portions of the output of the multiplier 34 prior to applying that output to the summer 36. In addition, the limiter 32 should be modified to have the capability of bi-directional limiting, and the insertion of the DC offset prior to limiting should be capable of appropriately offsetting both the positive and negative excursions of a bi-polar control signal.

Another modification to the system shown in FIG. 3 is used where even better noise performance is desired. This latter modification, in effect, controls the threshold where limiting occurs in the limiter 32 such that, when the video signal has a poor signal-to-noise ratio, the limiting threshold is raised to prevent excessive peaking of the noise.

One method of implementing this modification is shown in FIG. 7 in which a conventional voltage controlled amplifier 37 is included between the rectifier 25 and the low pass filter 28. In other respects, the system of FIG. 3 may remain unchanged.

As shown, the amplifier 37 receives an AGC (automatic gain control) signal which may be of the conventional type developed in television receivers. Suffice it to say that the AGC voltage varies as a function of the strength of the signal received at the receiver's input antenna.

When the signal at the antenna is of a relatively low level, the AGC voltage reduces the gain of the amplifier 37. Thus, magnitude variations in the control signal which had previously exceeded the limiting threshold of the limiter 32 (FIG. 3) may now be reduced to the point where they are below that limiting threshold. Noise excursions in the control signal are likewise reduced in amplitude so that they also do not exceed the limiting threshold. Consequently, many noise excursions in the control signal will be output from the limiter 32 at a level less than unity, whereby corresponding noise excursions in the peaking signal are developed at a reduced gain level at the output of the multiplier 34.

The result of the operation described above is that reduced peaking of noise excursions is effected, along with reduced peaking for low level video signals. However, such low level video signals are frequently masked by noise in the television image anyway. The net result is a more pleasing television image.

The modification described above may also be effected by placing the voltage controlled amplifier 37 immediately before the rectifier 25 or at the output of the low pass filter 28. Of course, a similar result may be obtained in other ways, such as by actually altering the threshold of the limiter in response to the AGC voltage. Whatever method is used, it is important only that the net result be an effective change of the limiting threshold relative to the amplitude of the control signal.

Referring now to FIG. 8, there is shown a more detailed circuit diagram of a peaking circuit which operates similarly to that shown in FIG. 3. Portions of the circuit of FIG. 7 which correspond to the functional blocks of FIG. 3 are identified by corresponding reference numerals.

As shown, the unpeaked video signal is applied to an input lead 38 for application to the first derivative network 22. In the illustrated embodiment, the network 22 includes a pair of transistors 40 and 42 whose emitters are driven by current sources 44 and 46, respectively. Coupled between the emitters is a resistor 48, a coil 50 and a capacitor 52. With this arrangement, the current through the capacitor 52 corresponds to the filtered first derivative of the video signal at lead 38. Although the filtering effect of the coil 50 and the capacitor 52 is not necessary, it is desirable because it reduces the amount of noise in the video signal which is applied to the summer 36 via lead 54.

The collectors of the transistors 40 and 42 are grounded through resistors 56 and 58, whereby the output of the differentiator 22 at leads 60 and 62 corresponds to the first derivative of the video signal.

The first derivative signal, corresponding to the unprocessed control signal is coupled differentially to the inputs of a full wave rectifier 25. The latter rectifier includes emitter-coupled transistors 64 and 66 which are each biased to conduct on alternate cycles of the control signal. Thus, a rectified control signal is generated across emitter resistor 68.

A low pass filter 28, comprising a resistor 70 and a capacitor 72, filters the rectified control signal which is applied via a lead 74 to a multiplier-limiter 76. The latter circuit includes transistors 78, 80, 82 and 84 interconnected as shown to form a balanced modulator. The bases of transistors 78 and 84 receive the filtered and rectified control signal for modulating the peaking signal applied to the modulator via leads 86 and 88.

The peaking signal is developed by coupling the first derivative signal differentially to the bases of transistors 90 and 92. The emitters of those transistors are driven by current sources 94 and 96 and a capacitor 97 couples the emitters of transistors 90 and 92 together. The resultant signal at the collectors of transistors 90 and 92 corresponds to the second derivative of the video signal and is applied via leads 86 and 88 to the balanced modulator. This circuit arrangement causes the peaking signal to be multiplied by the control signal so that a modulated peaking signal is developed across a load resistor 98.

Because of the inherent limiting characteristics of the differential transistor pairs 78-80 and 82-84, the threshold action of the limiter 32 in FIG. 3 is achieved. In addition, a DC offset voltage is applied at point A in FIG. 7 to effect the function of the offset provided by the summer 30 in FIG. 3. That offset voltage is developed by transistors 99 and 100 in co-operation with resistors 102, 104 and 106. As indicated in FIG. 7, the resistor 106 is connected to point A in the multiplier-limiter 76.

The modulated peaking signal may be applied from the resistor 98 to a gain control stage 108 if it is desired to provide manual adjustment of the level of peaking. Such manual adjustment may be effected by a variable resistor 110 coupled between ground and a supply voltage for developing a variable control voltage at the wiper arm 112. In response to the value of the control voltage on the wiper arm 112, the gain control stage 108 may provide a controlled level peaking signal to the summer 36.

The output of the summer 36 is a peaked video signal for intensity modulating the electron beam or beams of a television receiver's cathode ray tube.

Although the embodiment of FIG. 8 is not shown as including an AGC-controlled amplifier for preventing excessive peaking of noise, such provision may be included. For example, a doubly balanced modulator may receive output leads 60 and 62 (FIG. 8) and an AGC voltage for varying the amplitude of the differential first derivative signals in accordance with variations in the AGC signal. Such a modulator may be constructed similarly to the illustrated configuration of transistors 78-84, 90 and 92 except that a resistor may replace the capacitor 97.

The outputs of the modulator may be capacitively coupled to the base terminals of transistors 64 and 66.

The peaking method and circuitry described herein provides pre-shoot and overshoot for the amplitude transitions of a video signal so as to provide a television image having improved detail, due in part to the fact that even low level video signals are peaked. At the same time, the peaked video signal lacks the enhanced noise content associated with prior peaking techniques because low level video signals are peaked to a lesser degree than high level video signals.

Although the invention has been described in terms of preferred steps and structure, it will be obvious to those skilled in the art that many modifications and alterations may be made thereto without departing from the invention. For example, the control signal and peaking signal need not be developed by derivative networks. Delay lines or the equivalent may also be used to generate those signals. Moreover, even though the invention has been described in the context of a video signal, other information-bearing signals may be peaked in the same manner. Accordingly, it is intended that all such modifications and alterations be included within the spirit and scope of the invention as defined by the appended claims.

What is claimed is:

1. A method of peaking the amplitude transitions of an unpeaked video signal having noise components, comprising:

developing from the video signal a peaking signal having magnitude variations related to and occurring in time correlation with amplitude transitions in the video signal;

developing from the video signal a control signal having magnitude variations related to and occurring in time correlation with amplitude transitions in the video signal and with peaking signal;

modulating the peaking signal with the control signal such that so long as the magnitude of the control signal exceeds a predetermined threshold associated with a video signal transition of a preselected value, the peaking signal is caused to be coupled to an output terminal at or above a first gain level and such that so long as the magnitude of the control signal is below the predetermined threshold, the peaking signal is coupled to the output terminal at a gain level which is substantially greater than zero but lower than said first gain level; and combining the modulated peaking signal appearing at said output terminal with the video signal to cause amplitude transitions in the video signal to be peaked by the modulated peaking signal, such that at amplitude transitions in the video signal corresponding to above-threshold levels of the control signal, greater peaking of the video signal is effected, and such that at amplitude transitions of the video signal corresponding to below-threshold levels of the control signal, lesser peaking is effected and low level components and noise in the peaking signal are combined with the video signal;

whereby a peaked video signal is produced which is capable of yielding television pictures which have sharply peaked, high level brightness transitions, and yet which are natural looking without excessive noise due to the presence of a limited amount of low level peaking components and noise in the peaking signal.

2. A method as set forth in claim 1 wherein said peaking signal is developed by taking the second derivative of the video signal.

3. A method as set forth in claim 1 wherein said control signal is developed by taking the first derivative of the video signal.

4. A method as set forth in claim 1 wherein the video signal is developed from a signal input to a receiver, wherein the receiver develops an AGC signal whose value varies as a function of the strength of the input signal, and further including the step of varying said predetermined threshold relative to the control signal in response to the AGC signal such that high level noise components of the peaking signal are coupled to said output terminal at a level less than said first gain level.

5. A method as set forth in claim 1 wherein magntiude variations in the control signal are superimposed on a baseline voltage, and wherein the step of modulating the peaking signal includes translating said baseline voltage to a predetermined minimum value greater than zero, limiting to a predetermined maximum value the magnitude variations in the control signal which exceed said predetermined threshold, and multiplying the resultant control signal times the peaking signal.

6. A method as set forth in claim 5 wherein the step of modulating the peaking signal further includes causing magnitude variations in the control signal which are above the minimum value of baseline voltage and below said predetermined threshold to have an amplitude intermediate the mimimum baseline voltage and the amplitude of the limited magnitude variations prior to multiplying the peaking signal by the resultant control signal.

7. A method as set forth in claim 5 including filtering the control signal to reduce the amplitude of high frequency and noise components therein prior to limiting the magnitude variations of the control signal.

8. In a television receiver, a method of peaking the amplitude transitions of a video signal having noise components, comprising:
developing a peaking signal corresponding to the second derivative of the video signal and its noise components;

developing a control signal corresponding to the first derivative of the video signal;

modulating the peaking signal by the control signal such that magnitude variations in the peaking signal which are in time correlation with predeterminedly high level magnitude variations in the control signal are coupled to an output terminal at a relatively high gain level, such that magnitude variations in the peaking signal which are in time correlation with variations in the control signal whose magnitude is less than the predeterminedly high level are coupled to the output terminal at a level lower than said high gain level, and such that all remaining components of the peaking signal are coupled to the output terminal at a level which is substantially greater than zero but lower than said high gain level; and combining the modulated peaking signal appearing at said output terminal with the video signal to cause amplitude transitions in the video signal to be peaked by the modulated peaking signal, so that relatively high level amplitude transitions in the video signal receive the greatest peaking, relatively lower level amplitude transitions in the video signal receive lesser peaking, and low level components and noise in the peaking signal are combined with the video signal.

9. A method as set forth in claim 8 further including full-wave rectifying the control signal so as to develop unipolar amplitude transitions therein prior to modulating the peaking signal.

10. A method as set forth in claim 9 further including filtering relatively high frequency components from the rectified control signal prior to modulating the peaking signal.

11. A method as set forth in claim 8 wherein the television receiver develops an AGC voltage whose value is a function of the signal strength at the receiver's antenna, and further including the step of varying the amplitude of the control signal in response to variations in the value of the AGC signal such that high level noise components in the video signal do not receive substantial peaking.

12. A method of peaking the amplitude transitions of an unpeaked information-bearing signal having noise components, comprising:
developing from the information-bearing signal a peaking signal having magnitude variations related to and occurring in time correlation with amplitude transitions in the information-bearing signal;

developing from the information-bearing signal a control signal having magnitude variations related to and occurring in time correlation with amplitude transitions in the information-bearing signal and the peaking signal;

modulating the peaking signal with the control signal such that so long as the magnitude of the control signal exceeds a predetermined threshold associated with an information-bearing signal transition of a preselected value, the peaking signal is caused to be coupled to an output terminal at or above a first gain level, and such that so long as the magnitude of the control signal is below the predetermined threshold, the peaking signal is coupled to the output terminal at a gain level which is substantially greater than zero but lower than said first level; and combining the modulated peaking signal appearing at said output terminal with the information-bearing signal to cause amplitude transitions in the information-bearing signal to be peaked by the modulated peaking signal, such that at amplitude transitions in the video signal corresponding to above-threshold levels of the control signal, greater peaking of the information-bearing signal is effected, and such that at amplitude transitions of the information-bearing signal corresponding to below-threshold levels of the control signal, lesser peaking is effected and low level components and noise in the peaking signal are combined with the information-bearing signal.

13. A circuit for peaking the amplitude transitions for an unpeaked video signal having noise components, comprising:
   means for developing from the video signal a peaking signal having magnitude variations related to and occurring in time correlation with amplitude transitions in the video signal;
   means for developing from the video signal a control signal having magnitude variations related to and occurring in time correlation with amplitude transitions in the video signal and the peaking signal;
   means for modulating the peaking signal with the control signal such that so long as the magnitude of the control signal exceeds a predetermined threshold associated with a video signal transition of a preselected value, the peaking signal is caused to be coupled to an output terminal at or above a first gain level, and such that so long as the magnitude of the control signal is below the predetermined threshold, the peaking signal is coupled to the output terminal at a gain level which is substantially greater than zero but lower than said first gain level; and
   means for combining the modulated peaking signal appearing at said output terminal with the video signal to cause amplitude transitions in the video signal to be peaked by the modulated peaking signal, such that at amplitude transitions in the video signal corresponding to above threshold levels of the control signal, greater peaking of the video signal is effected, and such that at amplitude transitions of the video signal corresponding to below-threshold levels of the control signal, lesser peaking is effected and low level components and noise in the peaking signal are combined with the video signal;
   whereby a peaked video signal is produced which is capable of yielding television pictures which have sharply peaked high level brightness transitions, and yet which are natural-looking without excessive noise due to the presence of a limited amount of low level peaking components and noise in the peaking signal.

14. A circuit as set forth in claim 13 wherein the video signal is developed from a signal input to a television receiver, wherein the receiver develops an AGC signal whose value varies as a function of the strength of the input signal, and further including means responsive to the AGC signal for varying the value of said predetermined threshold relative to the control signal such that high level noise components of the peaking signal are coupled to said output terminal at a level less than said first gain level.

15. A circuit as set forth in claim 14 wherein said varying means includes a voltage controlled amplifier receiving the control signal and the AGC signal for reducing the amplitude of the control signal in response to an AGC signal indicative of low signal strength of the input signal.

16. A circuit as set forth in claim 13 wherein said means for developing the control signal includes means for receiving the video signal and for deriving the first derivative thereof.

17. A circuit as set forth in claim 16 wherein said means for developing the peaking signal includes means for receiving the first derivative of the video signal and for deriving therefrom the second derivative of the video signal.

18. A circuit as set forth in claim 17 wherein said means for developing the control signal further includes means for full-wave rectifying the first derivative of the video signal.

19. A circuit as set forth in claim 18 wherein said means for developing the control signal further includes a low pass filter disposed in circuit between said full-wave rectifying means and said modulating means for removing high frequency components from the rectified first derivative signal.

20. A circuit as set forth in claim 18 wherein said modulating means includes a multiplier for multiplying the peaking signal by the control signal.

21. A circuit as set forth in claim 20 wherein said multiplier is adapted to pass to said output terminal at a relatively high gain level the amplitude variations in the peaking signal which are in time correlation with amplitude variations in the control signal which exceed a predetermined threshold level, and to pass other components of the peaking signal to said output terminal at a gain level which is substantially greater than zero but lower than said high gain level.

* * * * *